United States Patent
Numakunai

(10) Patent No.: US 7,518,460 B2
(45) Date of Patent: Apr. 14, 2009

(54) AMPLITUDE MODULATION APPARATUS, AMPLITUDE LIMITING METHOD, AND COMPUTER-READABLE PROGRAM

(75) Inventor: Takayuki Numakunai, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 224 days.

(21) Appl. No.: 11/629,362

(22) PCT Filed: Jun. 13, 2005

(86) PCT No.: PCT/JP2005/010815

§ 371 (c)(1),
(2), (4) Date: Dec. 12, 2006

(87) PCT Pub. No.: WO2005/122518

PCT Pub. Date: Dec. 22, 2005

(65) Prior Publication Data

US 2008/0207142 A1    Aug. 28, 2008

(30) Foreign Application Priority Data

Jun. 14, 2004   (JP) .............................. 2004-175739

(51) Int. Cl.
*H04L 27/20* (2006.01)
(52) U.S. Cl. ..................................... 332/103
(58) Field of Classification Search ......... 332/100–105; 375/296–308
See application file for complete search history.

(56) References Cited

FOREIGN PATENT DOCUMENTS

| JP | 10-294766 | 11/1998 |
| JP | 2003-168931 | 6/2003 |
| JP | 2005-142824 | * 6/2005 |
| WO | WO 02/49308 | 6/2002 |

* cited by examiner

*Primary Examiner*—David Mis
(74) *Attorney, Agent, or Firm*—Ladas & Parry LLP

(57) ABSTRACT

The present invention relates to an amplitude modulation apparatus, an amplitude limiting method, and a transmission apparatus for performing amplitude limitation on an orthogonally modulated signal. The amplitude modulation apparatus, the amplitude limiting method, and the transmission apparatus enable peak value suppression of a transmission wave with a simple structure. An amplitude limiting apparatus that performs amplitude limitation on an orthogonally modulated signal includes first amplitude limiting means (31, 32) for limiting to predetermined amplitudes the amplitudes of an I-component and a Q-component of the orthogonally modulated signal that are orthogonal to each other, and second amplitude limiting means (33-41) for performing further amplitude limitation on the I-component and the Q-component according to the difference between the amplitude-limited I-component and Q-component obtained by the first amplitude limiting means.

6 Claims, 8 Drawing Sheets

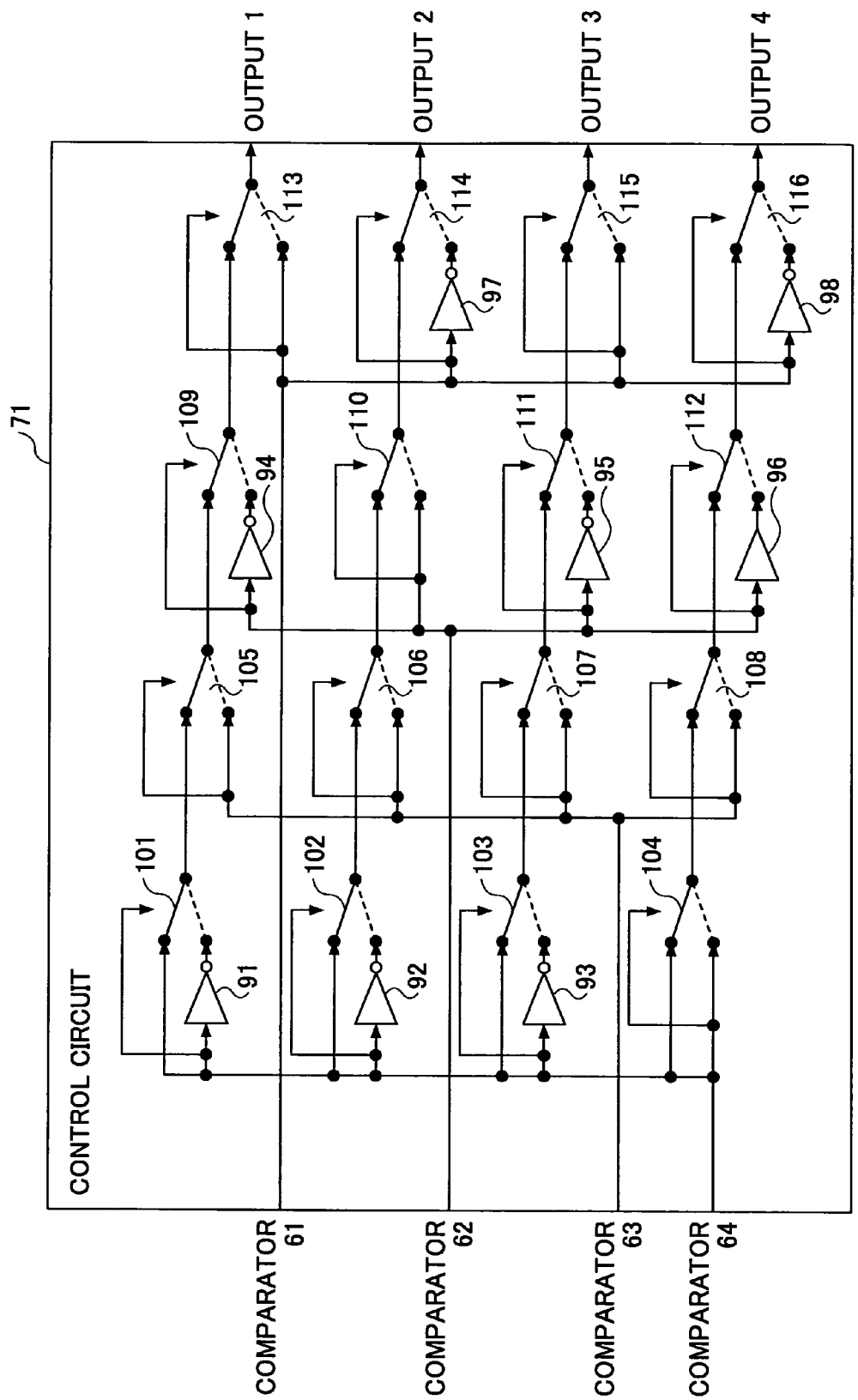

FIG.6

| | OCTAGONAL REGION | FIRST REGION A1 | SECOND REGION A2 | THIRD REGION A3 | FORTH REGION A4 |
|---|---|---|---|---|---|
| COMPARATOR 61 | FALSE | TRUE | FALSE | FALSE | FALSE |
| COMPARATOR 62 | FALSE | EITHER | TRUE | FALSE | FALSE |
| COMPARATOR 63 | FALSE | EITHER | EITHER | TRUE | FALSE |
| COMPARATOR 64 | FALSE | EITHER | EITHER | EITHER | TRUE |
| SWITCH 73 | HIGH LEVEL | LOW LEVEL | HIGH LEVEL | LOW LEVEL | HIGH LEVEL |
| SWITCH 74 | HIGH LEVEL | HIGH LEVEL | LOW LEVEL | LOW LEVEL | HIGH LEVEL |
| SWITCH 75 | HIGH LEVEL | LOW LEVEL | HIGH LEVEL | LOW LEVEL | HIGH LEVEL |
| SWITCH 76 | HIGH LEVEL | HIGH LEVEL | HIGH LEVEL | LOW LEVEL | LOW LEVEL |

AMPLITUDE MODULATION APPARATUS, AMPLITUDE LIMITING METHOD, AND COMPUTER-READABLE PROGRAM

The present application is based on and claims the benefit of the earlier filing data of Japanese Patent Application No. 2004-175739 filed on Jun. 14, 2004, the entire contents of which are hereby incorporated by reference.

TECHNICAL FIELD

The present invention relates to an amplitude modulation apparatus, an amplitude limiting method, and a computer-readable program for performing amplitude limitation on an orthogonally modulated signal.

BACKGROUND ART

When the peak-to-average power ratio of a transmission wave is relatively high in a wireless device that performs orthogonal modulation, the input signal level for a power amplifier has to be reduced. Accordingly, the power amplifier has to have a wide dynamic range. However, when the dynamic range of the power amplifier is increased, power consumption may be increased. Therefore, the amplitude of the input signal for the power amplifier has to be limited to reduce the peak power of the input signal.

FIGS. 9A and 9B are diagrams illustrating exemplary amplitude limiting operations according to the prior art. It is noted that in these drawings, the horizontal axis represents the I-component of an orthogonally modulated signal, and the vertical axis represents the Q-component of the orthogonally modulated signal. FIG. 9A illustrates a case where the amplitudes of the I-component and the Q-component of the orthogonally modulated signal are limited to be less than or equal to predetermined amplitudes (max). FIG. 9B illustrates a case in which the amplitudes of the I-component and the Q-component are limited by a circular boundary.

In FIG. 9A where the amplitude is limited by a square boundary, the amplitudes of the I-component and the Q-component are limited to be less than or equal to predetermined amplitudes (max). For example, the amplitude limiting operations may be described as follows:

if($I$>max)$I$=max if($Q$>max)$Q$=max

It is noted that in the above-described operations, 'I' denotes the I-component, 'Q' denotes the Q-component, and 'max' denotes the limit value. As can be appreciated, these operations may be completed by executing one comparison process and one substitution process, and thereby, the amplitude limiting operations may be speedily executed by a simple hardware configuration.

In FIG. 9B where the amplitude is limited by a circular boundary, the peak value may be maintained to be less than or equal to a predetermined limit value (max). Accordingly, the peak value may be effectively suppressed to be prevented from flaring. For example, the corresponding operation may be described as follows:

if($I*I+Q*Q$>max)$I$=max*$I$/square root($I*I+Q*Q$)

It is noted that this operation requires multiplication, division, and squaring processes in addition to comparison and substitution processes. (see Patent Reference 1: Japanese Laid-Open Patent Publication No. 2003-168931)

It is noted that when a square limit range is used as in the case of FIG. 9A, although the operation processes and hardware configurations may be simplified, the amplitude may not be adequately limited when signal components are limited to be close to the peak point P31 in which case the peak value may not be adequately suppressed.

When a circular limit range is used as in the case of FIG. 9B, although the peak value may be effectively suppressed, multiplication, division, and squaring processes are required in addition to comparison and substitution processes so that the operational processes and the hardware configurations may be complicated and difficult to implement.

DISCLOSURE OF THE INVENTION

According to an aspect of the present invention, there is provided an amplitude modulation apparatus, an amplitude limiting method, and a computer-readable program for effectively suppressing the peak value with a simple configuration.

According to one embodiment of the present invention, an amplitude limiting apparatus is provided that includes first amplitude limiting means (31, 32) for limiting to predetermined amplitudes the amplitudes of an I-component and a Q-component of an orthogonally modulated signal that are orthogonal to each other, and second amplitude limiting means (33-41) for performing amplitude limitation on the I-component and the Q-component according to the difference between the I-component and the Q-component.

In a preferred embodiment, the second amplitude limiting means (33-41) includes a subtractor (36) that calculates the difference between the I-component and the Q-component, an adder (34, 35) that calculates the sum of the difference calculated by the subtractor (36) and a limit value, and halving means (40, 41) that halves the sum calculated by the adder (34, 35).

According to an aspect of the present invention, by limiting the amplitudes of the I-component and the Q-component of an orthogonally modulated signal to predetermined amplitudes and further limiting the I-component and the Q-component according to the difference between the I-component and the Q-component, the peak value of a transmission wave may be effectively suppressed with a simple structure, for example.

BRIEF DESCRIPTION OF THE DRAWINGS

FIG. 5 is a block diagram showing a configuration of a control circuit 71;

FIG. 6 is a table illustrating operations of the control circuit by the octagonal limit unit 39;

BEST MODE FOR CARRYING OUT THE INVENTION

[Transmission Apparatus 1]

Figure 1:
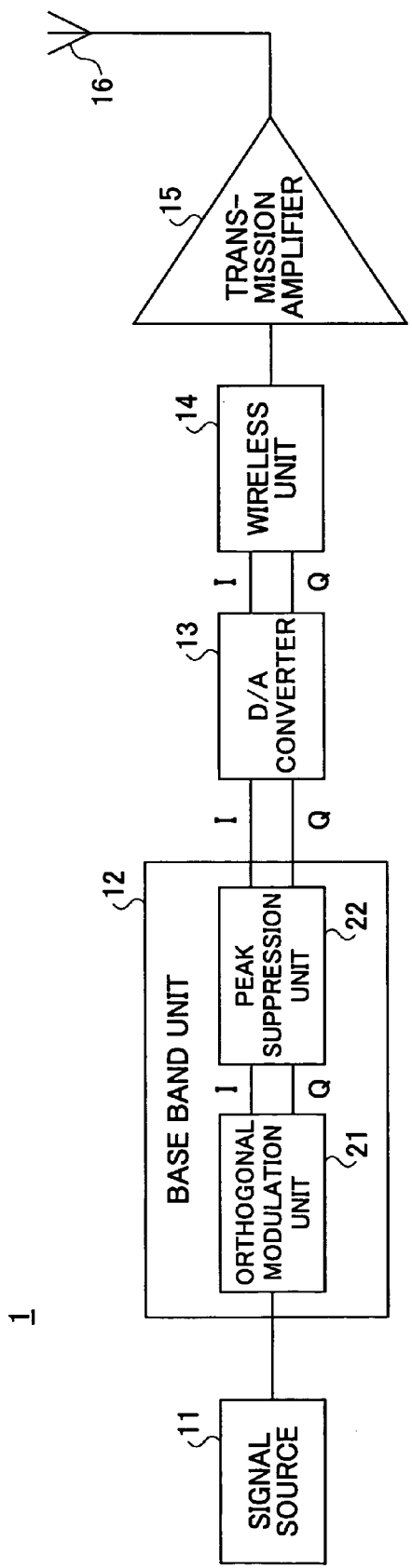
FIG. 1 is a block diagram illustrating an embodiment of the present invention.

FIG. 1 is a block diagram illustrating an embodiment of the present invention.

A transmission apparatus 1 according to the present embodiment includes a signal source 11, a base band unit 12, a D/A (digital/analog) converter 13, a wireless unit 14, a transmission amplifier 15, and an antenna 16.

The signal source 11 transmits a transmission signal. The transmission signal transmitted by the signal source 11 is input to the base band unit 12. The base band unit 12 performs digital modulation on the transmission signal from the signal source 11 to generate an I-signal and a Q-signal having signal components that are perpendicular to each other.

The I-signal and the Q-signal generated by the base band unit 12 are input to the D/A converter 13. The D/A converter 13 converts the input I-signal and Q-signal from the base band unit 12 into analog signals.

The analog signals generated by the D/A converter 13 are input to the wireless unit 14. The wireless unit 14 modulates a carrier wave using the analog signals from the D/A converter 13, and generates a transmission signal. The transmission signal generated by the wireless unit 14 is input to the transmission amplifier 15.

The transmission amplifier 15 amplifies the transmission signal from the wireless unit 14. The amplified transmission signal from the transmission amplifier 15 is externally discharged.

The base band unit 12 includes an orthogonal modulation unit 21 and a peak suppression unit 22.

The orthogonal modulation unit 21 performs orthogonal modulation on the signal from the signal source 11 to output an I-signal and a Q-signal that have components that are orthogonal to each other. The I-signal and the Q-signal output from the orthogonal modulation unit 21 are input to the peak suppression unit 22.

[Peak Suppression Unit 22]

Figure 2:
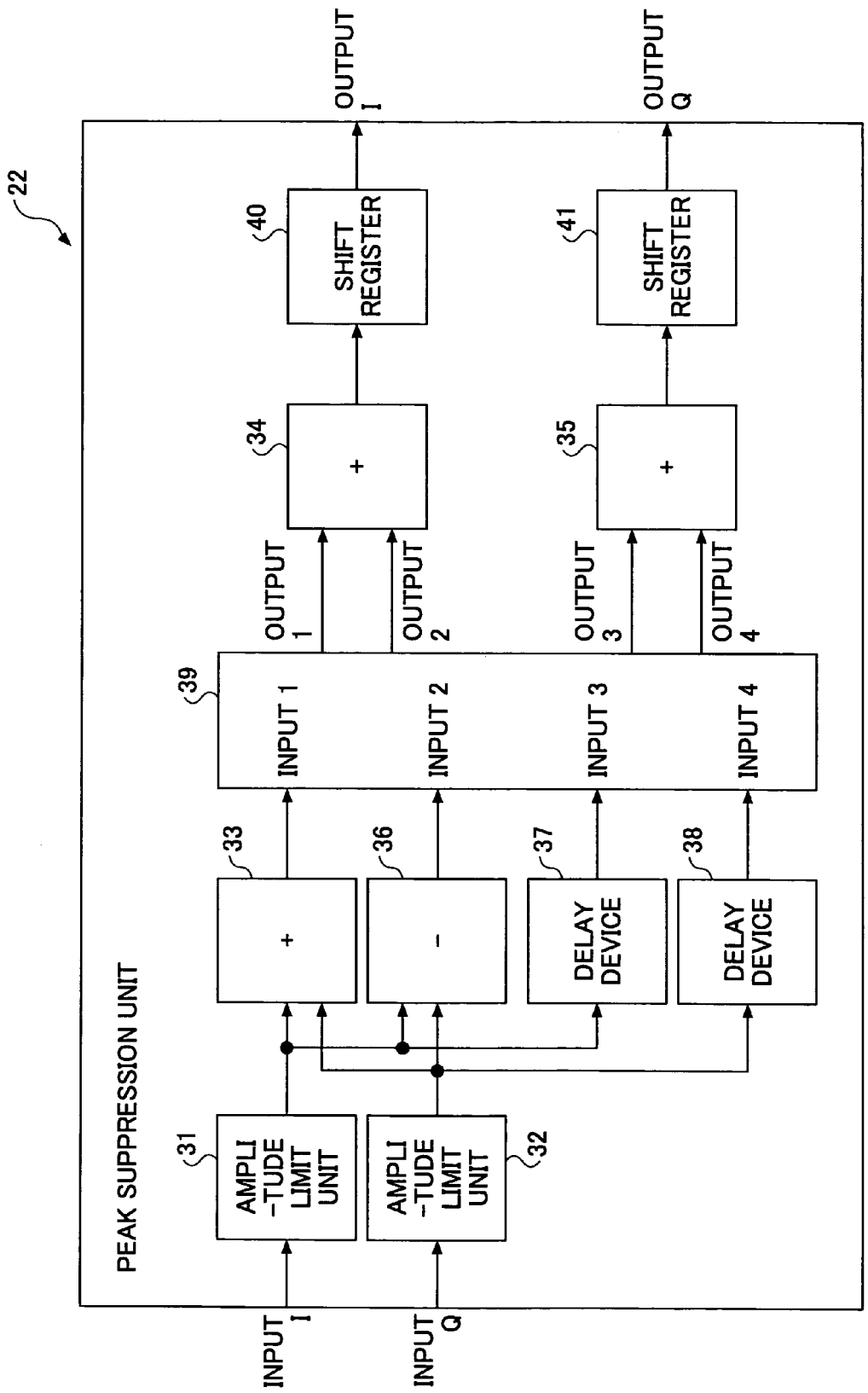
FIG. 2 is a block diagram showing a configuration of a peak suppression unit 22.

FIG. 2 is a block diagram showing a configuration of the peak suppression unit 22.

The peak suppression unit 22 includes amplitude limit units 31, 32, adders 33, 34, 35, a subtractor 36, delay devices 37, 38, an octagonal limit unit 39, and shift registers 40 and 41.

The I-signal from the orthogonal modulation unit 21 is input to the amplitude limit unit 31. The Q-signal from the orthogonal modulation unit 21 is input to the amplitude limit unit 32.

The amplitude limit unit 31 limits the amplitude of the I-signal to be less than or equal to a predetermined amplitude. The amplitude limit unit 32 limits the amplitude of the Q-signal to be less than or equal to a predetermined amplitude.

In the present embodiment, it is assumed that the amplitude limit value for the amplitude limit unit 31 and the amplitude limit value for the amplitude limit unit 32 are equal.

[Amplitude Limit Unit 31]

Figure 3:
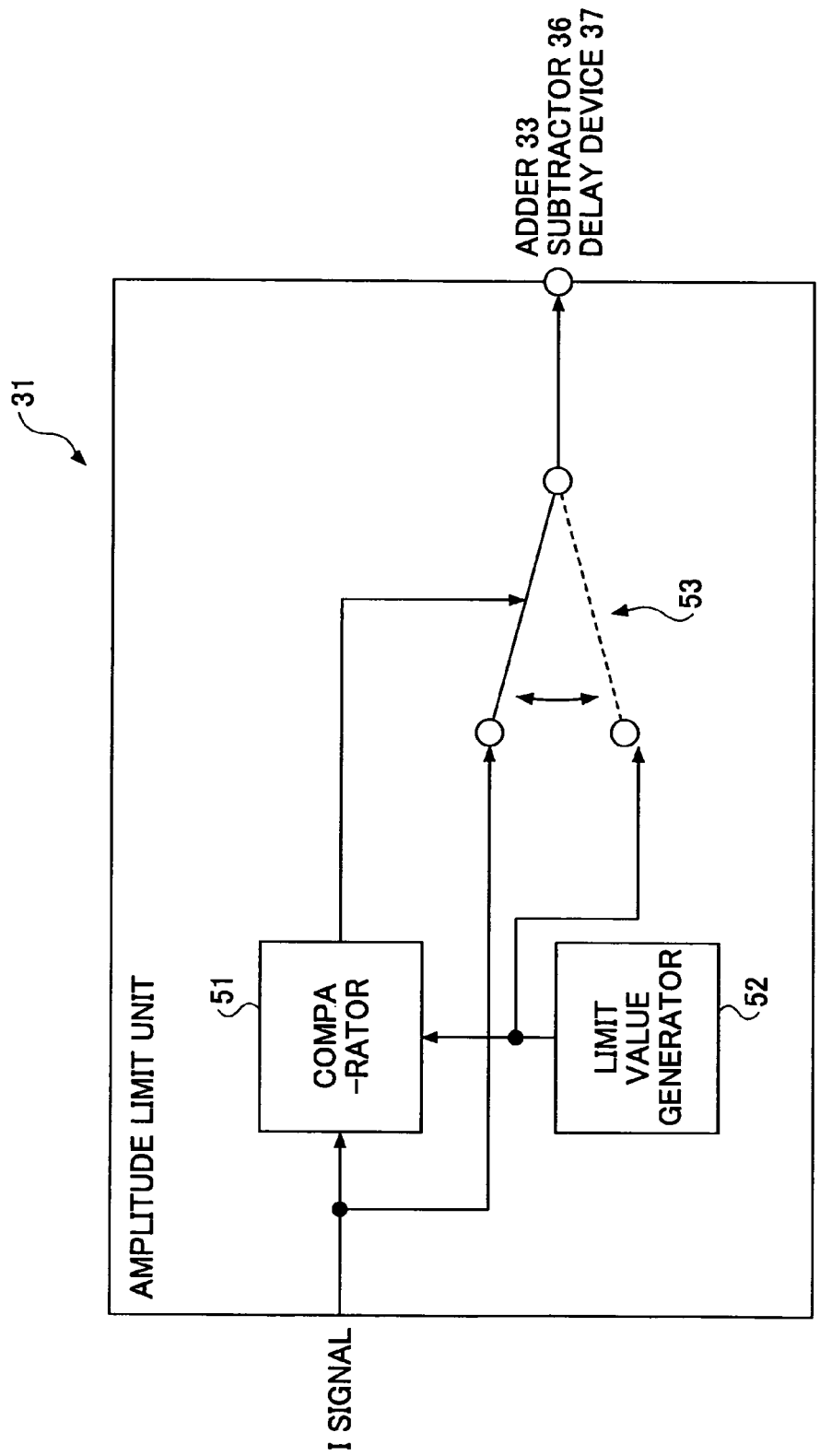
FIG. 3 is a block diagram showing a configuration of an amplitude limit unit 31.

FIG. 3 is a block diagram showing a configuration of the amplitude limit unit 31.

The amplitude limit unit 31 includes a comparator 51, a limit value generator 52, and a switch 53.

The comparator 51 inputs the I-signal from the orthogonal modulation unit 21 and a limit value generated by the limit value generator 52. For example, the comparator 51 may output a signal that is switched to high level when the value of the I-signal is greater than the limit value and switched to low level when the value of the I-signal is less than or equal to the limit value. The output of the comparator 51 is input to the switch 53.

The switch 53 inputs the I-signal from the orthogonal modulation unit 21 and the limit value generated by the limit value generator 52, and selectively outputs the I-signal or the limit value generated by the limit value generator 52 according to the output of the comparator 51. For example, the switch 53 may output the limit value generated by the limit value generator 52 when the value of the I-signal is greater than the limit value, namely, when the output of the comparator 51 is high level. The switch 53 may output the I-signal when the output of the comparator 51 is low level.

It is noted that the amplitude limit unit 32 may have a configuration identical to that of the amplitude limit unit 31 shown in FIG. 3. For example, the amplitude limit unit 32 may output the limit value generated by the limit value generator 52 when the value of the Q-signal is greater than the limit value, and output the Q-signal when the value of the Q-signal is less than or equal to the limit value.

The output of the amplitude limit unit 31 is input to the adder 33, the subtractor 36, and the delay device 37. The output of the amplitude limit unit 32 is input to the adder 33, the subtractor 36, and the delay device 38.

The adder 33 calculates the sum of the output of the amplitude limit unit 31 and the output of the amplitude limit unit 32, and supplies the absolute value of the calculated sum to the octagonal limit unit 39. The subtractor 34 subtracts the output of the amplitude controlling unit 32 from the output of the amplitude controlling unit 31 and supplies the absolute value of the calculated difference to the octagonal limit unit 39. It is noted that although the absolute value of the calculated sum is used in the present example, the present invention is not limited to such an example.

[Octagonal Limit Unit 39]

Figure 4:
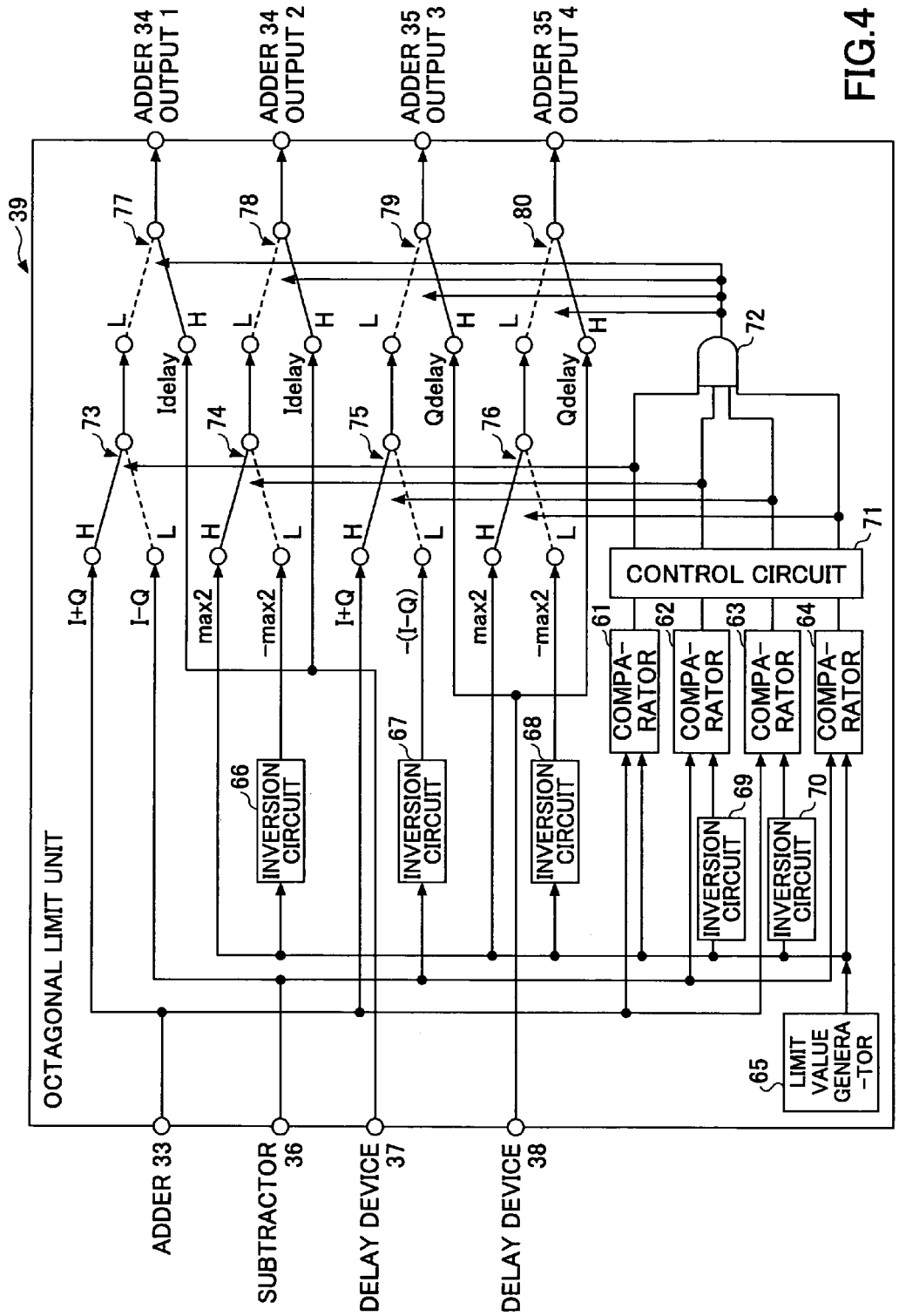
FIG. 4 is a block diagram showing a configuration of an octagonal limit unit 39.

FIG. 4 is a block diagram showing a configuration of the octagonal limit unit 39.

The octagonal limit unit 39 includes comparators 61-64, a limit value generator 65, inversion circuits 66-70, a control circuit 71, an AND gate 72, and switches 73-80.

The output (I+Q) of the adder 33 is supplied to the comparators 61, 63, and the switches 73, 75. The output (I−Q) of the subtractor 36 is supplied to the comparators 62, 64, the switch 73, and the inversion circuit 67. The output Idelay of the delay device 37 is supplied to the switches 77 and 78. The output Qdelay of the delay device 38 is supplied to the switches 79 and 80. The limit value generator 65 generates a limit value max2 for the I-component and the Q-component. The limit value max2 generated by the limit value generator 65 is supplied to the comparators 61, 64, the inversion circuits 66, 68, 69, 70, and the switches 74, 76.

The comparator 61 receives the output (I+Q) of the adder 33 and the limit value max2 generated by the limit value generator 65. The comparator 61 performs the following comparison process in order to determine whether a coordinate defined by the I-component and the Q-component is within a first region A1:

$$(I+Q) > \text{max2}$$

The comparator 61 outputs a low level signal when the output (I+Q) of the adder 33 is greater than the limit value max2 and outputs a high level signal when the output (I+Q) of the adder 33 is less than or equal to the limit value max2.

The comparator 62 receives the output (I−Q) of the subtractor 36 and the output of the inversion circuit 69. The inversion circuit 69 receives the limit value max2 generated by the limit value generator 65. The inversion circuit 69 obtains an inverse limit value −max2 of the limit value max2 generated by the limit value generator 65 and outputs the inverse limit value −max2. The comparator 62 performs the following comparison process in order to determine whether the coordinate defined by the I-component and the Q-component is within a second region A2:

(I−Q)>−max2

The comparator 62 outputs a high level signal when the output (I−Q) of the subtractor 36 is greater than the inverse limit value −max2 and outputs a low level signal when the output (I−Q) of the subtractor 36 is less than or equal to the inverse limit value −max2.

The comparator 63 receives the output (I+Q) of the adder 33 and the output of the inversion circuit 70. The inversion circuit 70 receives the limit value max2 generated by the limit value generator 65. The inversion circuit 70 obtains an inverse limit value −max2 of the limit value max2 generated by the limit value generator 65 and outputs the inverse limit value −max2. The comparator 63 performs the following comparison process in order to determine whether the coordinate defined by the I-component and the Q-component is within a third region A3:

(I+Q)>−max2

The comparator 63 outputs a high level signal when the output (I+Q) of the adder 33 is greater than the inverse limit value −max2, and outputs a low level signal when the output (I+Q) is less than or equal to the inverse limit value −max2.

The comparator 64 receives the output (I−Q) of the subtractor 36 and the limit value max2 generated by the limit value generator 65. The comparator 64 performs the following comparison process in order to determine whether the coordinate defined by the I-component and the Q-component is within a fourth region A4:

(I−Q)>max2

The comparator 64 outputs a low level signal when the output (I−Q) of the subtractor 36 is greater than the limit value max2 and outputs a high level signal when the output (I−Q) is less than or equal to the limit value max2.

The outputs of the comparators 61-64 are supplied to the control circuit 71. The control circuit 71 controls the switches 73-76 according to the outputs of the comparators 61-64 by using switching control signals. Also, the switching control signals for the switches 73-76 are supplied to the AND gate 72. The AND gate 72 obtains and outputs the AND logic of the switching signals being supplied to the switches 73-76 from the control circuit 71. The output of the AND gate 72 is supplied to the switches 77-80.

FIG. 5 is a block diagram showing a configuration of the control circuit 71.

The control circuit 71 includes inversion circuits 91-98 and switches 101-116.

The inversion circuits 91-93 receive the output of the comparator 64. The inversion circuits 91-93 obtain an inverse value of the output of the comparator 64 and output the inverse value. The output of the inversion circuit 91 is supplied to the switch 101. The output of the inversion circuit 92 is supplied to the switch 102. The output of the inversion circuit 93 is supplied to the switch 103.

The inversion circuits 94-96 receive the output of the comparator 62. The inversion circuits 94-96 obtain an inverse value of the output of the comparator 62 and output the inverse value. The output of the inversion circuit 94 is supplied to the switch 109. The output of the inversion circuit 95 is supplied to the switch 111. The output of the inversion circuit 96 is supplied to the switch 112.

The inversion circuits 97 and 98 receive the output of the comparator 61. The inversion circuits 97 and 98 obtain an inverse value of the output of the comparator 61 and output the inverse value. The output of the inversion circuit 97 is supplied to the switch 114. The output of the inversion circuit 98 is supplied to the switch 116.

The switch 101 receives the output of the comparator 64 and the output of the inversion circuit 91. The switch 101 selectively outputs the output of the comparator 64 or the output of the inversion circuit 91 according to the output of the comparator 64.

The switch 102 receives the output of the comparator 64 and the output of the inversion circuit 92. The switch 102 selectively outputs the output of the comparator 64 or the output of the inversion circuit 92 according to the output of the comparator 64.

The switch 103 receives the output of the comparator 64 and the output of the inversion circuit 93. The switch 103 selectively outputs the output of the comparator 64 or the output of the inversion circuit 93 according to the output of the comparator 64.

The switch 104 receives the output of the comparator 64, and outputs the output of the comparator 64.

The switch 105 receives the output of the switch 101 and the output of the comparator 63. The switch 105 selectively outputs the output of the switch 101 or the output of the comparator 63 according to the output of the comparator 63.

The switch 106 receives the output of the switch 102 and the output of the comparator 63. The switch 106 selectively outputs the output of the switch 102 or the output of the comparator 63 according to the output of the comparator 63.

The switch 107 receives the output of the switch 103 and the output of the comparator 63. The switch 107 selectively outputs the output of the switch 103 or the output of the comparator 63 according to the output of the comparator 63.

The switch 108 receives the output of the switch 104 and the output of the comparator 63. The switch 108 selectively outputs the output of the switch 104 or the output of the comparator 63 according to the output of the comparator 63.

The switch 109 receives the output of the switch 105 and the output of the inversion circuit 94. The switch 109 selectively outputs the output of the switch 105 and the output of the inversion circuit 94 according to the output of the comparator 62.

The switch 110 receives the output of the switch 106 and the output of the comparator 62. The switch 110 selectively outputs the output of the switch 106 or the output of the comparator 62 according to the output of the comparator 62.

The switch 111 receives the output of the switch 107 and the output of the inversion circuit 95. The switch 111 selectively outputs the output of the switch 107 or the output of the inversion circuit 95 according to the output of the comparator 62.

The switch 112 receives the output of the switch 108 and the output of the inversion circuit 96. The switch 112 selectively outputs the output of the switch 108 or the output of the inversion circuit 96 according to the output of the comparator 62.

The switch 113 receives the output of the switch 109 and the output of the comparator 61. The switch 113 selectively outputs the output of the switch 109 or the output of the comparator 61 according to the output of the comparator 61.

The switch 114 receives the output of the switch 110 and the output of the inversion circuit 97. The switch 114 selectively outputs the output of the switch 110 or the output of the inversion circuit 97 according to the output of the comparator 61.

The switch 115 receives the output of the switch 111 and the output of the comparator 61. The switch 115 selectively outputs the output of the switch 111 or the output of the comparator 61 according to the output of the comparator 61.

The switch 116 receives the output of the switch 112 and the output of the inversion circuit 98. The switch 116 selectively outputs the output of the switch 112 or the output of the inversion circuit 98 according to the output of the comparator 61.

The output of the switch 113 is supplied to the switch 73 and the AND gate 72. The output of the switch 114 is supplied to the switch 74 and the AND gate 72. The output of the switch 115 is supplied to the switch 75 and the AND gate 72. The output of the switch 116 is supplied to the switch 76 and the AND gate 72.

The AND gate 72 outputs the AND logic of the outputs of the switches 113, 114, 115, and 116. The output of the AND gate 72 is supplied to the switches 77-80.

The switch 77 receives the output (I+Q) or (I−Q) of the switch 73 and the output Idelay of the delay device 37. The switch 77 selectively outputs the output (I+Q) or (I−Q) of the switch 73 when the output of the AND gate 72 is at low level and selectively outputs the output Idelay of the delay device 37 when the output of the AND gate 72 is at high level.

The switch 78 receives the output max2 or −max2 of the switch 74 and the output Idelay of the delay device 37. The switch 78 selectively outputs the output max2 or −max2 of the switch 74 when the output of the AND gate 72 is at low level and selectively outputs the output Idelay of the delay device 37 when the output of the AND gate 72 is at high level.

The switch 79 receives the output (I+Q) or −(I−Q) of the switch 75 and the output Qdelay of the delay device 38. The switch 79 selectively outputs the output (I+Q) or −(I−Q) of the switch 75 when the output of the AND gate 72 is at low level and selectively outputs the output Qdelay of the delay device 38 when the output of the AND gate 72 is at high level.

The switch 80 receives the output max2 or −max2 of the switch 76 and the output Qdelay of the delay device 38. The switch 80 selectively outputs the output max2 or −max2 of the switch 76 when the output of the AND gate 72 is at low level and selectively outputs the output Qdelay of the delay device 38 when the output of the AND gate 72 is at high level.

The adder 34 calculates the sum of the output of the switch 77 and the output of the switch 78 and outputs the calculated sum. The output of the adder 34 is supplied to the shift register 40. The shift register 40 shifts the sum calculated by the adder 34 by one bit to obtain a value equal to one half of the sum calculated by the adder 34. The output of the shift register 40 controls the I-signal within an octagonal range.

The adder 35 calculates the sum of the output of the switch 79 and the output of the switch 80 and outputs the calculated sum. The output of the adder 35 is supplied to the shift register 41. The shift register 41 shifts the sum calculated by the adder 35 by one bit to obtain a value equal to one half of the sum calculated by the adder 35. The output of the shifter register controls the Q-signal within an octagonal range.

FIG. 6 is a table illustrating operations of the octagonal limit unit 39 by the control circuit 71.

As is illustrated in FIG. 6, the output of the comparator 61 may be a true value corresponding to a low level when a point determined by the I-component and the Q-component is within the first region A1, and the output of the comparator 61 may be a false value corresponding to a high level when the point is within the second through fourth regions A2-A4 and an octagonal region. The output of the comparator 62 may be a true value corresponding to a low level when the point determined by the I-component and the Q-component is within the second region A2, and the output of the comparator 62 may be a false value corresponding to a high level when the point is within the third and fourth regions A3, A4, and the octagonal region. It is noted that the output of the comparator 62 may be either a true value or a false value when the point is within the first region A1.

Also, the output of the comparator 63 may be a true corresponding to a low level when the point determined by the I-component and the Q-component is within the third area A3, and the output of the comparator 63 may be a false value corresponding to a high level when the point is within the fourth region A4 and the octagonal region. It is noted that the output of the comparator 63 may be either a true value or a false value when the point is within the first and second regions A1 and A2.

The output of the comparator 64 may be a true value corresponding to a low level when the point determined by the I-component and the Q-component is within the fourth region A4, and the output of the comparator 64 may be a false value corresponding to a high level when the point is within the octagonal region. It is noted that the output of the comparator 64 may be either a true value or a false value when the point is within the first through third regions A1-A3.

When the point determined by the I-component and the Q-component is within the octagonal region, the switches 73-76 shown in FIG. 4 select high level signals that are represented by solid lines in FIG. 4. When the point determined by the I-component and the Q-component is within the first region A1, the switches 73 and 75 shown in FIG. 4 select low level signals represented by broken lines in FIG. 4, and the switches 74 and 75 shown in FIG. 4 select high level signals represented by solid lines.

When the point determined by the I-component and the Q-component is within the second region A2, the switches 73, 75, and 76 shown in FIG. 4 select high level signals represented by solid lines in FIG. 4, and the switch 74 selects a low level signal represented by a broken line in FIG. 4. When the point determined by the I-component and the Q-component is within the third region A3, the switches 73-76 shown in FIG. 4 select low level signals represented by broken lines in FIG. 4. When the point determined by the I-component and the Q-component is within the fourth region A4, the switches 73-75 shown in FIG. 4 select high level signals represented by solid lines in FIG. 4, and the switch 76 select a low level signal represented by a broken line.

It is noted that "(I−Q)" or "(I+Q)" and "max2" or "−max2" are selected by switching the switches 73 and 74 and the selected values are supplied to the adder 34. Also, "(I−Q)" or "−(I+Q)" and "max2" or "−max2" are selected by switching the switches 75 and 76 and the selected values are supplied to the adder 35.

In this way, four outputs are selectively output from the octagonal limit unit 39 by the control circuit 71. The four outputs selected by the octagonal limit unit 39 are supplied to the adders 34 and 35 so that final signal processes for octagonal limitation may be performed.

By performing the final signal processes, in the first region A1, the signal I of the I-component may be limited to an I-component limit value Iclipped where $$I\text{clipped}=I-Q+\text{max2}$$

and the signal Q of the Q-component may be limited to a Q-component limit value Qclipped where $$Q\text{clipped}=-(I-Q)+\text{max}2$$

In the second region A2, the signal I of the I-component may be limited to an I-component limit value Iclipped where $$I\text{clipped}=I+Q-\text{max}2$$

and the signal Q of the Q-component may be limited to a Q-component limit value Qclipped where $$Q\text{clipped}=I+Q+\text{max}2$$

In the third region A3, the signal I of the I-component may be limited to an I-component limit value Iclipped where $$I\text{clipped}=I-Q-\text{max}2$$

and the signal Q of the Q-component may be limited to a Q-component limit value Qclipped where $$Q\text{clipped}=-(I-Q)-\text{max}2$$

In the fourth region A4, the signal I of the I-component may be limited to an I-component limit value Iclipped where $$I\text{clipped}=I+Q+\text{max}2$$

and the signal Q of the Q-component may be limited to a Q-component limit value Qclipped where $$Q\text{clipped}=I+Q-\text{max}2$$

[Operations]

Figure 7:
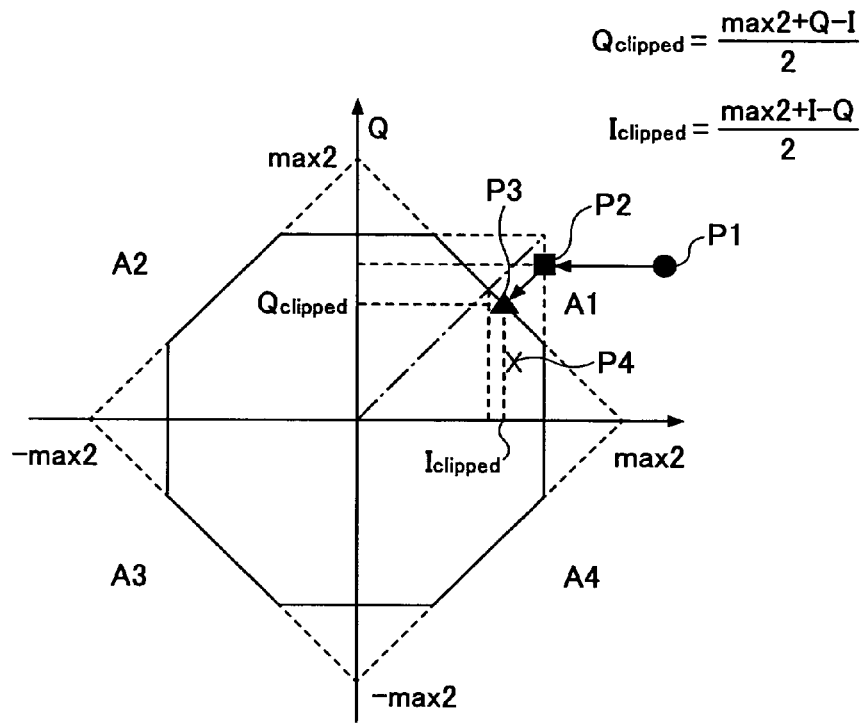
FIG. 7 is a diagram illustrating operations of the peak suppression unit 22.

FIG. 7 is a diagram illustrating operations of the peak suppression unit 22. In FIG. 7, the horizontal axis represents the I-component of an orthogonally modulated signal, and the vertical axis represents the Q-component of the orthogonally modulated signal.

As is shown in FIG. 7, an orthogonally modulated signal may be represented by a point determined by its I-component and Q-component.

According to the present embodiment, when a signal represented by symbol P1 is supplied to the peak suppression unit 22 from the orthogonal modulation unit 21, first, the amplitude limit units 31 and 32 limit the I-component and Q-component of the signal. Since the I-component of the symbol P1 is greater than the limit value I1 for the amplitude limit unit 31, the I-component of the symbol P1 is displaced to the limit value I1. Since the Q-component of the symbol P1 is less than the limit value Q1 for the amplitude limit unit 32, the Q-component is output from the amplitude limit unit 32 without being limited.

In this way, the signal is displaced from symbol P1 to symbol P2 positioned on a broken line shown in FIG. 7.

Then, the adder 33 calculates the sum of the I-component and the Q-component and supplies the calculated sum to the octagonal limit unit 39. Also, the subtractor 33 subtracts the Q-component from the I-component and supplies the calculated difference to the octagonal limit unit 39.

The octagonal limit unit 39 moves the symbol P2 in a 45-angle-direction toward the center to displace the signal from symbol P2 to symbol P3 positioned within an octagonal limit region. First, the octagonal limit unit 39 detects a region based on the addition value from the adder 34 and the subtraction value from the subtractor 36 and selects a signal to perform signal processes for displacing the signal from the symbol P2 to the symbol P3 in each region.

In the following, the signal processes of the octagonal limit unit 39 are described.

[Inside the Octagonal Limit Range]

If the output of the adder 33 is less than its corresponding limit value, and the output of the subtractor 36 is less than its corresponding limit value, the octagonal limit unit 39 may determine that a processing signal is within the octagonal limit range as with symbol P4 shown in FIG. 7. In this case, the outputs of the comparators 61-64 are each set to high level. When the outputs of the comparators 61-64 are high level, the output of the AND gate 72 may be high level. When the output of the AND gate 72 is high level, the switches 77-80 are switched to output the outputs of the delay devices 37 and 38 as is illustrated by the solid lines in FIG. 4.

When the outputs of the delay devices 37 and 38 are output by the switches 77-80, the same two outputs of the delay device 37 are added together by the adder 34, and the same two outputs of the delay device 38 are added together by the adder 35 so that the output of the delay device 37 and the output of the delay device 38 are doubled.

The output of the adder 34 is shifted by one bit by the shift register 40 so that the output of the adder 34 may be halved. In this way, an output equivalent to the output of the delay device 37 is output from the shift register 40.

The output of the adder 35 is shifted by one bit by the shift register 41 so that the output of the adder 35 may be halved. In this way, an output equivalent to the output of the delay device 38 is output from the shift register 41. Thus, in the present case, the I-signal and the Q-signal from the orthogonal modulation unit 21 are output without being changed.

[Outside the Octagonal Limit Range]

If the signal is still outside the octagonal limit range shown in FIG. 7 even after amplitude limitation on the symbol is performed by the amplitude limit units 31 and 32, the following processes represented by formulae (1) through (8) may be performed by the octagonal limit unit 39, the adders 34, 35, and the shift registers 40, 41 depending on the region in which the signal is situated.

In region A1, the I-component and Q-component signals are clipped by processes represented by the following formulae:

$$I\text{clipped}=(I-Q+\text{max}2)/2 \qquad (1)$$

$$Q\text{clipped}=\{-(I-Q)+\text{max}2\}/2 \qquad (2)$$

In region A2, the I-component and Q-component signals are clipped by processes represented by the following formulae:

$$I\text{clipped}=(I+Q-\text{max}2)/2 \qquad (3)$$

$$Q\text{clipped}=\{(I+Q)+\text{max}2\}/2 \qquad (4)$$

In region A3, the I-component and Q-component signals are clipped by processes represented by the following formulae:

$$I\text{clipped}=(I-Q-\text{max}2)/2 \qquad (5)$$

$$Q\text{clipped}=\{-(I-Q)-\text{max}2\}/2 \qquad (6)$$

In region A4, the I-component and Q-component signals are clipped by processes represented by the following formulae:

$$I\text{clipped}=(I+Q+\text{max}2)/2 \qquad (7)$$

$$Q\text{clipped}=\{(I+Q)-\text{max}2\}/2 \qquad (8)$$

[Effects]

Figure 8:
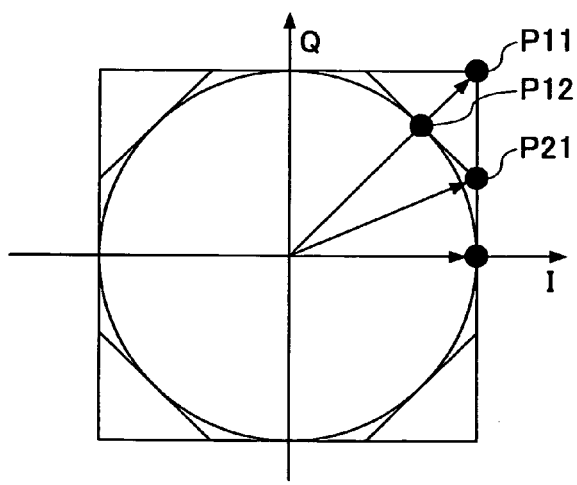
FIG. 8 is another diagram illustrating operations of the peak suppression unit 22.
Figure 9A:
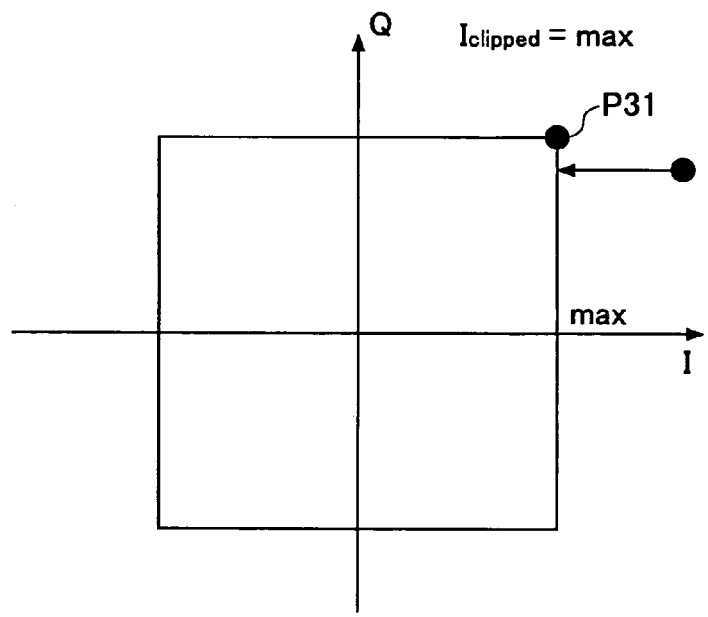
FIG. 9 is a diagram illustrating operations according to an exemplary limitation scheme according to the prior art.
Figure 9B:
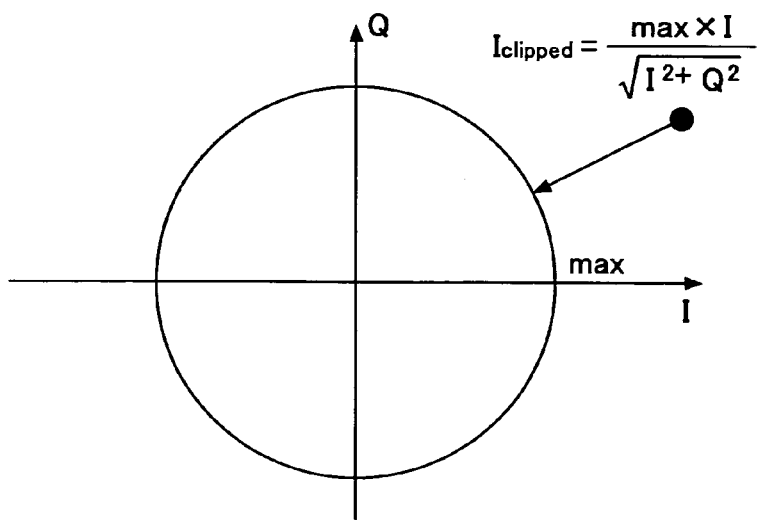

FIG. 8 is a diagram illustrating operations of the peak suppression unit 22. In FIG. 8, the horizontal axis represents the I-component of the orthogonally modulated signal, and the vertical axis represents the Q-component of the orthogonally modulated signal.

In the case where the peak value is limited by a square limit range, the peak value may not be adequately limited when the peak value is merely limited to the peak of the limit range such as the symbol P11 shown in FIG. 8 so that power consumption may be increased. However, in the case where the peak value is limited by an octagonal limit range as in the present embodiment, the symbol P11 may be limited to symbol P12, that is, the peak value may be limited to a limit value equivalent to the value to which the symbol P11 may be limited when a circular limit range is used. Also, in the case of using an octagonal limit range to limit the peak value, even when the peak value is limited to a peak of the octagonal limit range such as symbol P21 shown in FIG. 8, the limit value to which the peak value is limited may not be significantly different from the value at which the peak value may be limited in the case where a circular limit range is used so that the amplitude may be adequately limited.

Also, in the case where the peak value is limited by an octagonal limit range, the limitation processes may be performed by simply using amplitude limit circuits, comparators, adders, subtractors, switches, and shift registers as is illustrated in FIGS. 3 and 4, that is, the limitation processes may be performed by a simple structure. Also, the processes may be described and executed by simple software processes.

[Miscellaneous]

Although the above-described embodiment is implemented by hardware, the signal processes may also be described and executed by software. In the case where the processes are described by software, provided that the calculation time for amplitude limitation using a square limit range is represented by 1.00, the calculation time for amplitude limitation using an orthogonal limit range may be 5.25. On the other hand, the calculation time for performing amplitude limitation using a circular limit range may be 613.54. As can be appreciated, the calculation time for amplitude limitation in the case of using an octagonal limit range may be approximately 1/117 the calculation time for amplitude limitation in the case of using a circular limit range.

It is noted that the above-described peak suppression method may be suitably applied to modulation schemes such as the OFDM (orthogonal frequency division multiplex) scheme.

Also, it is noted that in the above-described peak suppression method, square peak value suppression is performed by the amplitude limit units 31 and 32 before octagonal limit operations are performed by the adders 33-35, the subtractor 36, the delay devices 37, 38, the octagonal limit unit 39, and the shift registers 40 and 41. However, in an alternative embodiment, the square peak value suppression operations by the amplitude limit units 31 and 32 may be performed after the octagonal limit operations in order to effectively maintain the phase of the transmission wave.

The invention claimed is:

1. An amplitude limiting apparatus that performs amplitude limitation on an orthogonally modulated signal, the apparatus comprising:

first amplitude limiting means for limiting amplitudes of an I-component and a Q-component of the orthogonally modulated signal to predetermined amplitudes which I-component and Q-component are orthogonal to each other; and second amplitude limiting means for performing amplitude limitation on the I-component and the Q-component according to a difference between the I-component and the Q-component.

2. The amplitude limiting apparatus as claimed in claim 1, wherein the second amplitude limiting means includes a subtractor that calculates the difference between the I-component and the Q-component;

an adder that calculates a sum of the calculated difference obtained by the subtractor and a limit value; and halving means for halving the calculated sum obtained by the adder.

3. An amplitude limiting method for performing amplitude limitation on an orthogonally modulated signal, the method comprising:

a first amplitude limiting step of limiting amplitudes of an I-component and a Q-component of the orthogonally modulated signal to predetermined amplitudes which I-component and Q-component are orthogonal to each other; and a second amplitude limiting step of determining a limited I-component and a limited Q-component according to a difference between the amplitude-limited I-component and Q-component obtained in the first amplitude limiting step.

4. An amplitude limiting method as claimed in claim 3, wherein the second amplitude limiting method includes a subtracting step of calculating the difference between the I-component and the Q-component;

an adding step of calculating a sum of the calculated difference obtained in the subtracting step and a limit value; and a halving step of halving the calculated sum obtained in the adding step.

5. A computer-readable medium containing a computer-readable program, which program when executed by a computer, causes the computer to perform a process comprising:

a first amplitude limiting step of limiting amplitudes of an I-component and a Q-component of an orthogonally modulated signal to predetermined amplitudes which I-component and Q-component are orthogonal to each other; and a second amplitude limiting step of determining a limited I-component and a limited Q-component according to a difference between the amplitude-limited I-component and Q-component obtained in the first amplitude limiting step.

6. The computer-readable medium as claimed in claim 5, wherein the second amplitude limiting step includes a subtracting step of calculating the difference between the I-component and the Q-component;

an adding step of calculating a sum of the calculated difference obtained in the subtracting step and a limit value; and a halving step of halving the calculated sum obtained in the adding step.

* * * * *